United States Patent [19]

Benfield

[11] Patent Number: 4,490,204

[45] Date of Patent: Dec. 25, 1984

[54] APPARATUS AND METHOD FOR MANUFACTURING SOLAR COLLECTORS

[75] Inventor: Sherwood G. Benfield, Matthews, N.C.

[73] Assignee: Unified Technologies, Inc., Charlotte, N.C.

[21] Appl. No.: 455,470

[22] Filed: Jan. 4, 1983

[51] Int. Cl.³ .............................................. B32B 31/20
[52] U.S. Cl. ..................................... 156/290; 126/426; 126/444; 126/449; 156/308.4; 156/309.9; 156/499; 156/553; 428/178; 428/179
[58] Field of Search ............... 126/426, 442, 444, 449, 126/450; 156/209, 244.22, 290, 292, 308.4, 309.9, 322, 324, 499, 553, 555, 581; 165/177, 180; 428/178, 179

[56] References Cited

U.S. PATENT DOCUMENTS

| | | | |
|---|---|---|---|
| 3,317,363 | 5/1967 | Weber | 156/244.22 X |
| 3,532,587 | 10/1970 | Ungar et al. | 156/581 X |
| 3,607,544 | 9/1971 | Earner et al. | 156/324 X |
| 3,868,945 | 3/1975 | Konopka et al. | 165/177 X |

Primary Examiner—Robert Dawson
Attorney, Agent, or Firm—Daniel E. McConnell

[57] ABSTRACT

Methods and apparatus for manufacturing solar heating devices of a type having bonded together sheets of thermoplastic material forming a flexible wall container for fluid to be heated. The methods and apparatus involve advancing first and second elongate indeterminate lengths of sheet material longitudinally along respective paths while heating, bonding and sealing the sheets. Specific arrangements and steps for heating, bonding, and sealing are described.

10 Claims, 17 Drawing Figures

APPARATUS AND METHOD FOR MANUFACTURING SOLAR COLLECTORS

FIELD AND BACKGROUND OF INVENTION

This invention relates to the manufacture of solar collectors, and particularly to the manufacture of solar heating devices of a type in which sheets of thermoplastic material are formed into flexible wall containers for fluid to be heated.

It has now been proposed to provide a solar fluid heater for use with a variety of types of solar heating devices and which is constructed of extremely lightweight reinforced thermoplastic material which exhibits unusual properties of strength and chemical inertness. Such devices are proposed as having a flexible wall construction and as being made from fabric reinforced sheets of fluoroplastic material such as polytetrafluoroethylene (also known by the trademark Teflon) fusibly bonded together to provide fluid flow passages therebetween. Such solar heating devices are recognized as having substantial advantages over the rigid pipe heaters more commonly encountered.

BRIEF DESCRIPTION OF INVENTION

It is an object of the present invention to provide apparatus and methods for manufacturing solar heating devices of the thin film type described. In realizing this object of the present invention, provision is made for high rates of production to be achieved by accomplishing high cyclical rates of forming individual devices. The rates of production achievable by the apparatus and methods to be described hereinafter are significantly higher than has been the case for rigid pipe devices.

Yet a further object of the present invention is to accomplish the manufacture of solar heating devices of the type described in a manner which is well adapted to automation. In realizing this object of the present invention, sheet material to be formed into devices is advanced in indeterminate lengths from a roll supply and the steps necessary to accomplish manufacture are performed as the running length of material advances. Such manufacture lends itself to achieving essentially continuous formation of devices, with concomitant high rates of production. In particular, the essentially continuous manufacturing steps may include advancing sheet material along predetermined paths of travel while heating predetermined portions of the sheets to an elevated bonding temperature, pressing the sheets to achieve bonding in a repetitive pattern forming fluid flow channels, and then sealing the sheets to form individual devices. Such steps are accomplished without intervention of an operator.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
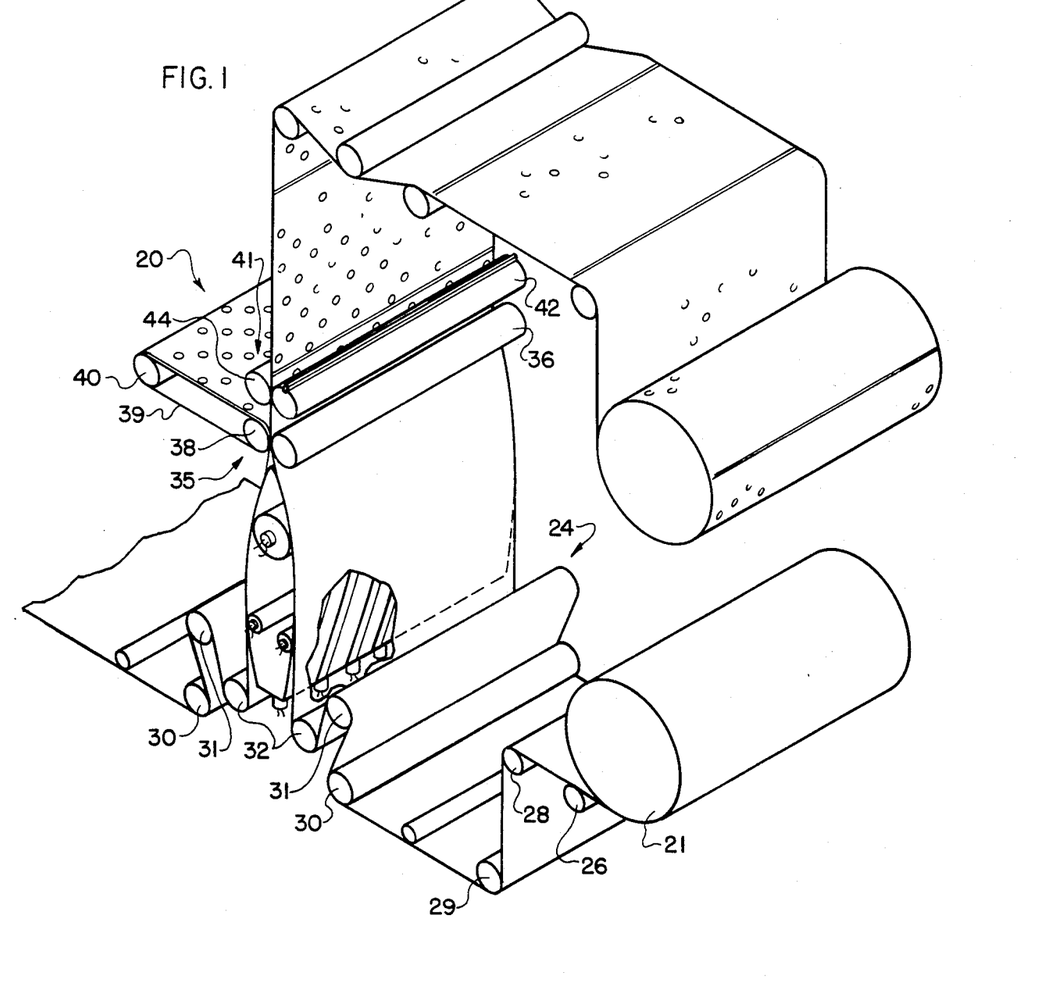
FIG. 1 is a somewhat schematic perspective view of a preferred form of apparatus in accordance with the present invention.
Figures 2, 3, 4:
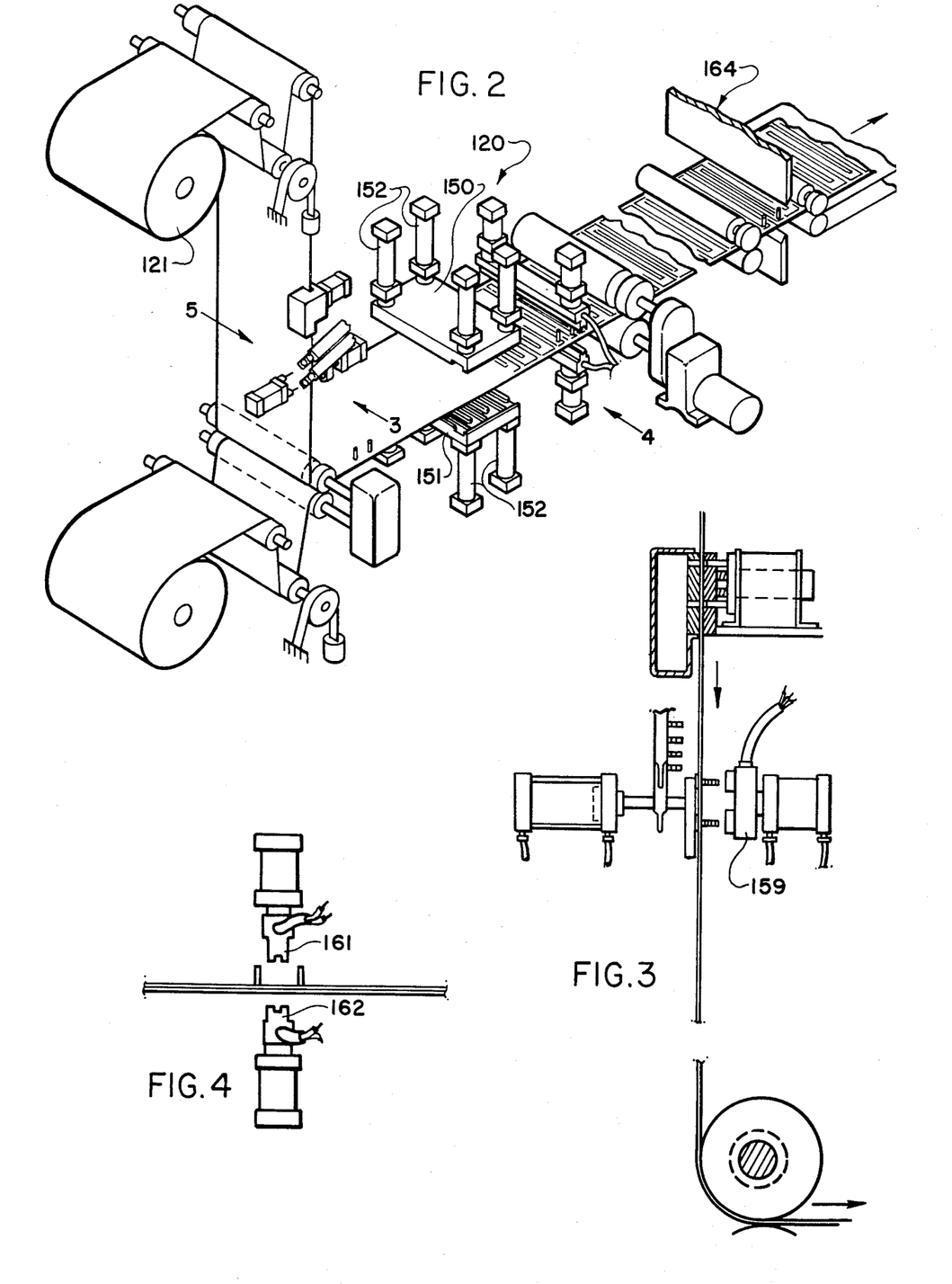
FIG. 2 is a view similar to FIG. 1, showing an alternate apparatus in accordance with this invention.
FIG. 3 is an enlarged scale elevation view, partly in section and taken generally as indicated by the arrow 3 in FIG. 2, illustrating portions of the apparatus of FIG. 2.
FIG. 4 is a view similar to FIG. 3, taken generally as indicated by the arrow 4 in FIG. 2.
Figure 5:
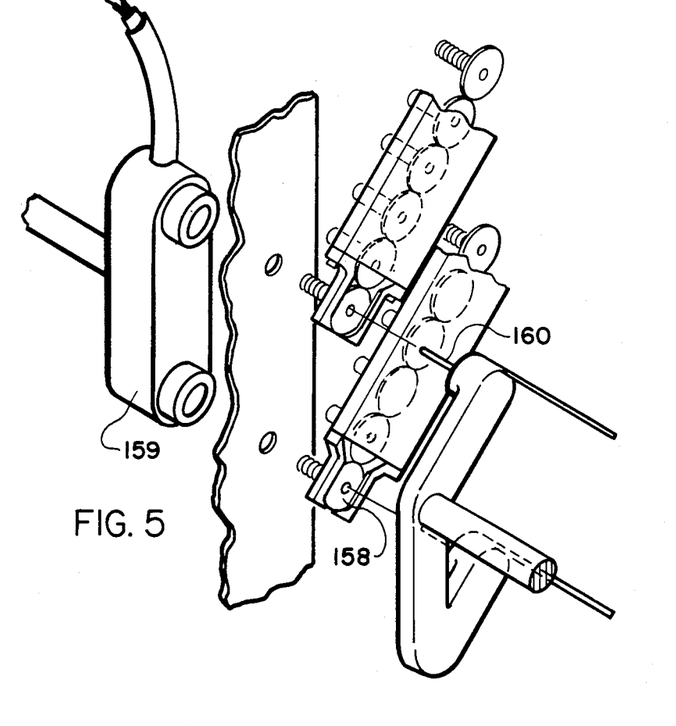
FIG. 5 is an enlarged perspective view of portions of the apparatus shown in FIGS. 2 and 3, taken generally as indicated by the arrow 5 in FIG. 2.
Figure 6:
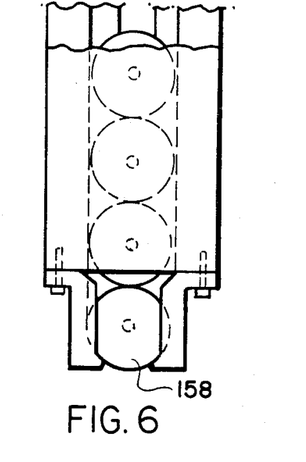
FIG. 6 is an elevation view of a portion of the apparatus shown in FIG. 5.
Figure 7:
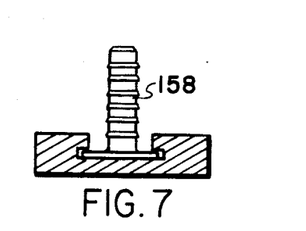
FIGS. 7 and 8 are section views through portions of the apparatus of FIG. 6, respectively taken generally along the lines 7—7 and 8—8 in that Figure.
Figure 8:
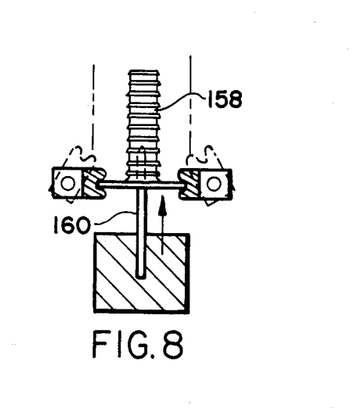
Figure 9:
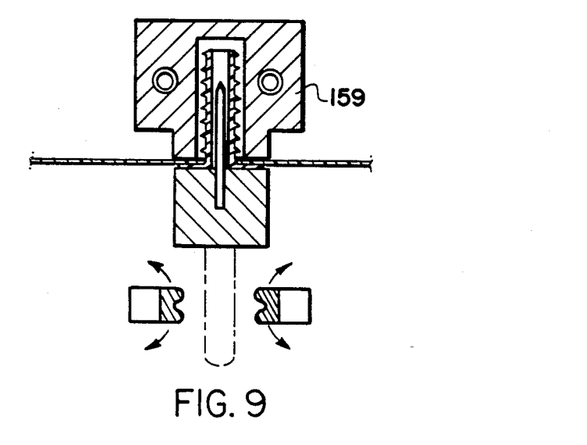
FIG. 9 is a view similar to FIGS. 7 and 8, showing the installation of nipples in a device according to the present invention.
Figure 10:
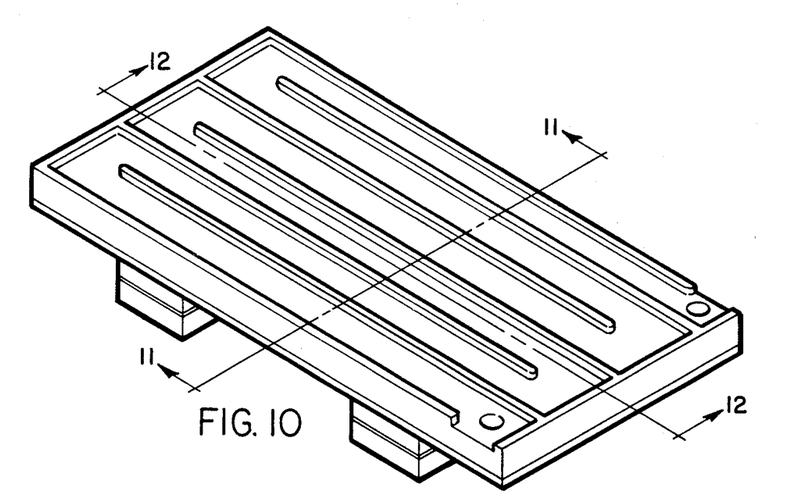
FIG. 10 is a perspective view of a press platen or plate forming a portion of the apparatus of FIG. 2.
Figure 11:
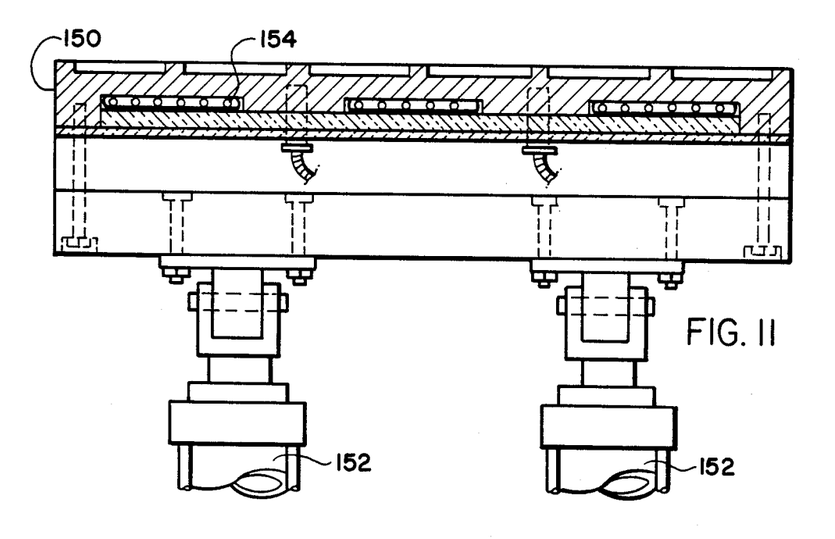
FIGS. 11 and 12 are elevation views, in section, through the platen of FIG. 10, respectively taken generally along the lines 11—11 and 12—12 in that Figure.
Figure 12:
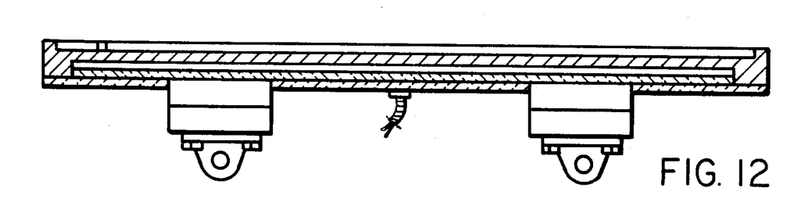
Figure 13:
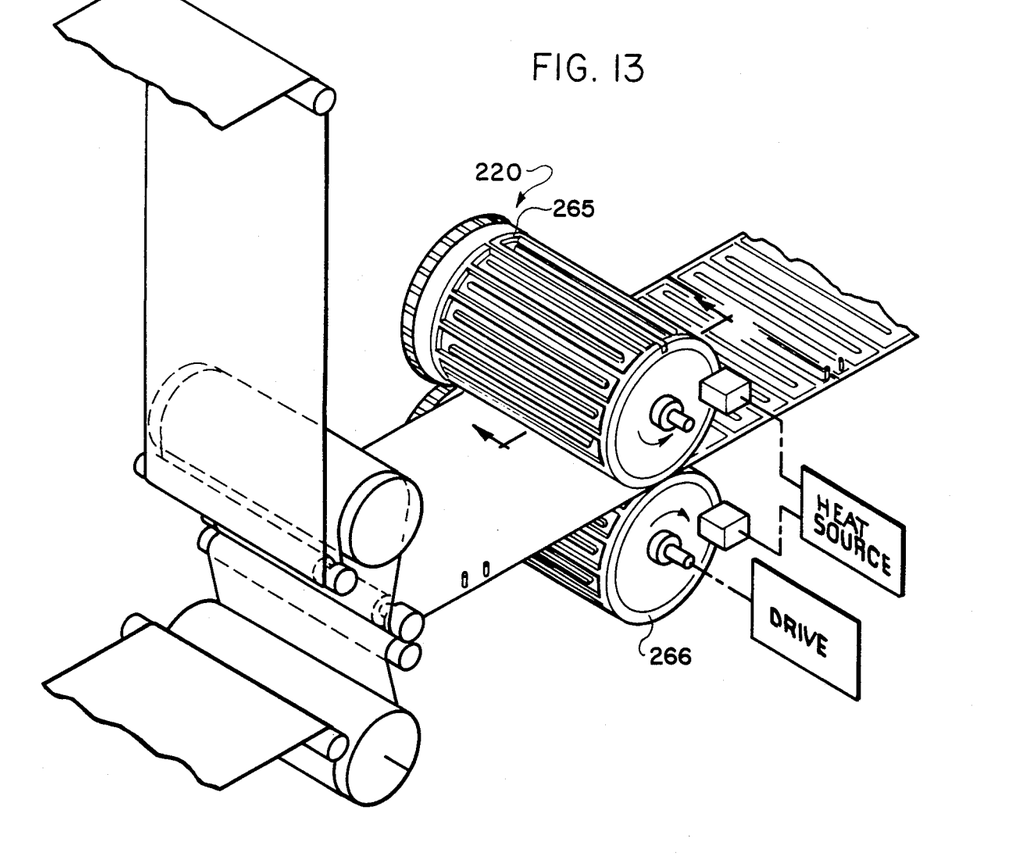
FIG. 13 is a view similar to FIG. 2, showing another alternate form for an apparatus in accordance with this invention.

Refering now more particularly to the accompanying drawings, a first and preferred form of apparatus for the present invention is there shown and identified generally at 20. In the description which follows, alternate forms of apparatus will be referred to and like components will be identified by reference characters similar to those now to be applied, and of higher hundreds orders. Thus, an alternate apparatus shown in FIG. 2 is generally indicated at 120, and an alternate apparatus shown in FIG. 13 is generally indicated at 220. Briefly stated, the apparatus 20 has feed means for advancing first and second elongate indeterminate length sheets of thermoplastic material, heating means for heating localized portions of the advancing sheets, press means for pressing the sheets together and bonding the sheets in a longitudinally repetitive pattern which defines flow passages therebetween, and sealing means for sealing the sheets along transverse lines and thereby forming the sheets into discrete length containers for fluid.

Preferably, the sheet material used with the apparatus and method of the present invention has certain desirable qualities. In paticular, the material is a fabric reinforced fluoroplastic, such as may be formed by deposition of fluoroplastics onto woven fiberglass. The processes of forming such sheet materials are the subject matter of protection apart from the present subject invention, as is the solar collector device here described incidental to the description of the apparatus and method of the present invention. Thus, the present description will not be directed in detail to such materials or the solar heating device per se. The attention of the interested reader is directed to the other disclosures of the properties of such materials and the resultant novel solar heater characteristics as are available.

Sheet material to be used in the manufacture of solar heating devices as contemplated by this invention is supplied in roll form and two rolls (one of which is indicated at 21) are mounted adjacent the apparatus 20. The elongate, indeterminate length sheets provided by the rolls are drawn from the rolls by a feed means generally indicated at 24 and which is capable of advancing the sheets S longitudinally along respective predetermined paths of travel while guiding the sheets in a common direction and into juxtaposition. The feed means has a plurality of feed rolls 25, 26, 28, 29, 30, 31, 32 for each of the two sheets. At least certain of the rolls (rolls 31 and 32 in the form shown) are driven by an appropriate motive means such as an electrical motor.

The apparatus 20 to which the present description refers is perhaps best adapted for vertical orientation, and the sheets S are thus fed upwardly in a common direction and into juxtaposition. It is to be noted however that the present invention contemplates that the orientation need not be exclusively vertical and that the various apparatus herein described may, indeed, operate in any desired orientation.

In accordance with the present invention and in order to accomplish bonding as described hereinafter, the apparatus 20 includes heating means mounted adjacent the paths of travel of the sheets for heating localized portions thereof. In the particular form employed in the apparatus 20 of FIG. 1, the heating means takes the form of a biconvex heater 34 positioned between the sheets S as they rise from the advancing means 24. The biconvex heater preferably is fabricated from sheet metal to have a streamline form similar to an airfoil. The metal is then covered by an appropriate thermal insulation and by electrical resistance heating strips, skewed relative to the path of travel of the sheets so as to insure more uniform heating of the opposing, inwardly facing surfaces of the sheets. In this form, those portions of the sheets which are heated to an elevated, bonding temperature are the inwardly facing surfaces. As will be familiar to persons of ordinary skill in the arts of electrical heating, appropriate controls may be provided to assure that the heater and sheet temperatures are as desired or necessary for bonding.

In order to bond the sheets together in a desired pattern, press means are provided and mounted adjacent the paths of travel of the sheets at a location at which the sheets are juxtaposed and heated. The press means, generally indicated at 35, bonds the sheets together in a longitudinally repetitive pattern which defines fluid flow passages therebetween. The pattern may be any selected one of several possibilities, including parallel flow arrangements, serial flow arrangements, serpentine, or dimple. Such flow patterns are known to persons of ordinary skill in the arts relating to solar collectors, having been proposed heretofore in connection with collectors fabricated by roll forming metal sheets, and accordingly will not be here described at great length. In the specific form illustrated in FIG. 1, the press means takes the form of a pair of rolls 36, 38 mounted for rotation about respective axes extending transversely of the sheets and parallel one to the other. The rolls 36, 38 together define a nip through which the sheets pass and at which pressure is applied thereto for bonding the heated surfaces together. In order to provide for ready changes in the pattern applied, one of the rolls 38 has an endless apron 39 trained thereabout. The apron is capable of movement along a closed path of travel defined between the one roll 38 and an idler roll 40, and passes through the nip of the rolls 36, 38 with the sheets S. A textured patterned surface is provided on the apron for engagement with a sheet and for defining the pattern of bonding for the sheets. The pattern may be a dimple pattern as shown or may be some other arrangement of ribs for defining some alternate pattern. For ease of definition in this description, all such textured surfaces are here referred to as "ribbed".

As the sheets S are advanced through the portions of the apparatus described to this point, the material is being handled in indeterminate running length. In order to provide for forming the bonded sheets into discrete length flexible wall containers, sealing means are mounted adjacent the paths of travel and at a location at which the sheets are juxtaposed and heated for sealing the sheets along transverse lines spaced longitudinally of the sheets at predetermined distances. In the particular form shown in FIG. 1, the sealing means, which is indicated generally at 41, is formed by a pair of rolls 42, 44 mounted for rotation about respective axes transverse to the sheets and parallel one to the other. The rolls 42, 44 together define a nip through which the sheets S pass and at which pressure is applied for sealing. At least one roll 42 has one or more longitudinally extending ribs which apply pressure for sealing. Rotation of the rolls 42, 44 may be controlled by a relatively slow drive, by which the length of containers formed may be established.

An alternate form of sealing means for the apparatus 20 may be provided by providing one or more transverse ribs on the apron 39, such that the apron pattern provides the flow determining bonding while the transverse ribs seal the sheets and determine the length of the containers.

As sheets are advanced beyond the sealing means 41, they are trained about suitable take-off rolls and to a take-up device or winding station. The roll of flexible wall containers thus formed may then be cut into individual containers and any necessary steps for completion of a solar heating device may be carried out. Such steps may include, for certain applications and as pointed out hereinafter, assembly with a pan, insulation and glazing and installation of connectors for fluid flow.

Referring now to FIGS. 2 through 12, an alternate form of apparatus in acordance with the present invention is there shown. The apparatus 120 differs from the apparatus 20 described above with reference to FIG. 1 in several ways, including the provision of intermittent feeding for the sheets S, the insertion and bonding of connectors or nipples, and the severing of sealed containers.

Intermittent feeding of the sheets is of significance, in the apparatus 120 of FIG. 2, in that the press means 135 comprises platen means shown in the form of a pair of press plates 150, 151. The press plates are mounted for reciprocation toward and away from one another, by means of rams or pressure fluid actuated cylinders 152. At least one of the press plates, and preferably both, have a ribbed surface (FIG. 10) for defining the repetitive pattern of bonding for the sheets. Where such press plates are used, the heating means preferably comprises an electrical resistance heater 154 operatively associated with at least one plate 151 as by being embedded within the plate structure. In such an arrangement, the sheet portions heated to an elevated bonding temperature are those portions engaged or contacted by the hot plate.

In order to insert connectors or nipples, the apparatus 120 of FIG. 2 is provided with a punch generally indicated at 155 and an insertion mechanism generally indicated at 156. The punch 155 is constructed to punch pairs of holes in a marginal edge portion of one sheet as the sheet advances toward the bonding location provided by the press means 135. The insertion mechanism 156 inserts pairs of nipples 158 into the pairs of holes and, by the cooperation of a heated bonding block 159 with insertion pins 160 carrying the nipples 158 (FIGS. 5 and 9), bonds the nipples into place for establishing fluid communication with the channels formed in the container being fabricated.

In the apparatus 120 of FIG. 2, sealing is accomplished by the provision of sealing platen means mounted for reciprocation adjacent the path of travel of the sheets and for engagement with the sheets. The sealing platen means takes the form of a pair of press bars 161, 162 at least one of which has a transverse rib on a surface thereof for defining a seal line for the sheets. The press bars are heated in a manner similar to the press means plates 150, 151 described above.

As the sheets S are intermittently advanced through the apparatus 120, punched, provided with connections for fluid, bonded and then sealed, a severing means 164 which may take the form of a knife cuts the containers one from another between the locations of sealing.

Figure 14:
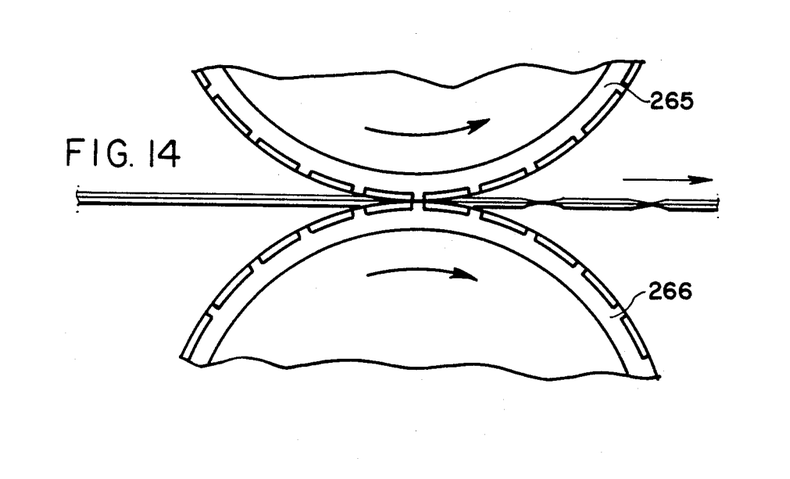
FIG. 14 is an enlarged elevation view of a portion of the apparatus of FIG. 13.

The apparatus 220 of FIGS. 13 and 14 differs from the apparatus 120 of FIG. 2 in that more nearly continuous forming of containers is accomplished through the provision of press means 235 in the form of a pair of configured rolls 265, 266. At least one, and preferably both, of the rolls 265, 266 is heated. The heating may be accomplished by incorporating electrical heating elements within the rolls, or by circulating heated fluid such as oil through the rolls. In either event, heating of localized portions of the sheets occurs through contact, in a manner similar to that of the apparatus 120 using press plates. As shown in the figures, at least one, and preferably both, of the rolls has a ribbed circumferential surface with a repetitive pattern of ribs thereon for defining the repetitive pattern of bonding for the sheets.

Figure 15:
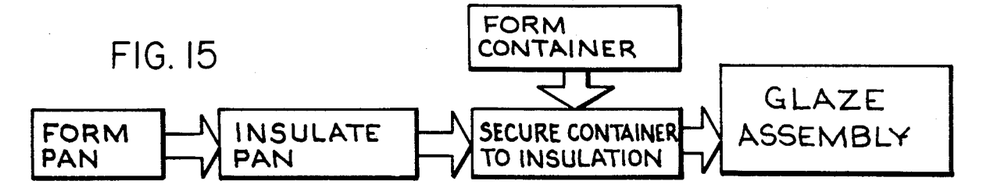
FIG. 15 is a flow diagram illustrating the assembly of a solar collector manufactured in accordance with the present invention.
Figure 16:
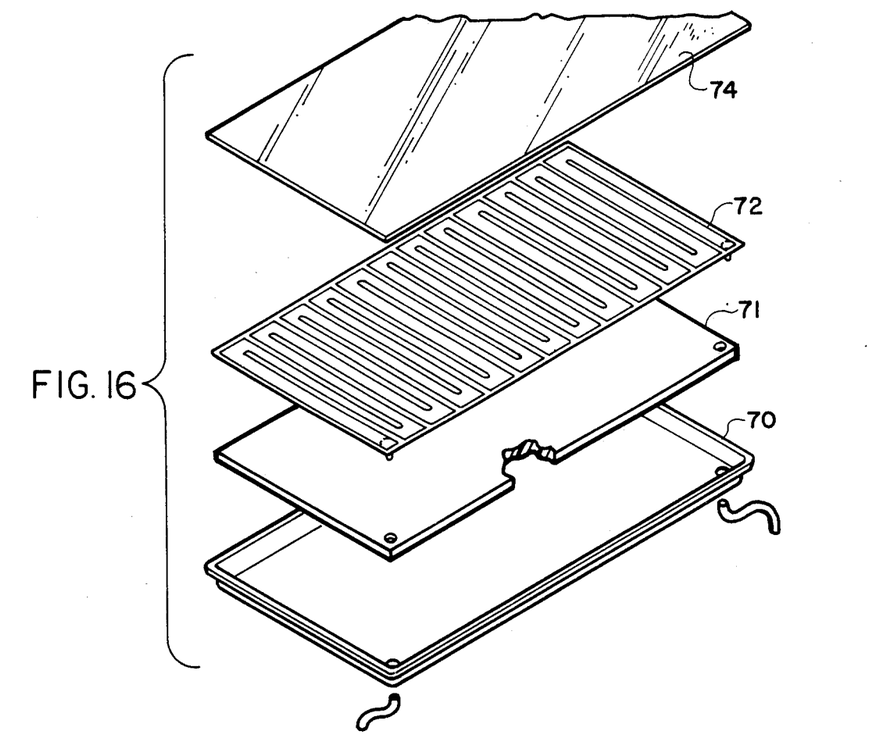
FIG. 16 is an exploded perspective view of the elements of a solar collector assembled as indicated in FIG. 15.
Figure 17:
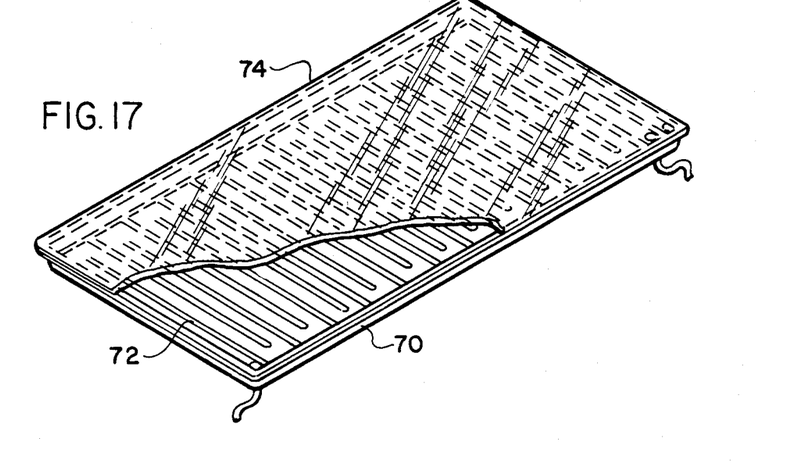
FIG. 17 is a perspective view of a solar collector assembled from the components of FIG. 16.

Regardless of the form of apparatus chosen in accordance with the present invention for fabricating containers, the containers thus formed may be used essentially directly as solar heating devices for low temperature applications such as pool heating, or may be assembled with other components in forming collectors for other types of applications. One such assembly is indicated in FIGS. 15 through 17. Referring to the diagram of FIG. 15, the steps of forming the envelope or container will follow from the apparatus operation as described above. In separate operations not here disclosed, a pan 70 may be formed and insulation 71 secured in the pan. The container 72 made in accordance with this invention is then secured onto the insulation 71 and covered with a suitable glazing 74 such as glass. The resulting collector is useful for higher temperature applications such as domestic water heating.

In the drawings and specifications there has been set forth a preferred embodiment of the invention and, although specific terms are used, the description thus given uses terminology in a generic and descriptive sense only and not for purposes of limitation.

That which is claimed is:

1. Apparatus for manufacturing solar heating devices of a type having bonded together sheets of thermoplastic material forming a flexible wall container for fluid, the apparatus comprising:

feed means for advancing first and second elongate indeterminate length sheets of thermoplastic material longitudinally along respective predetermined paths of travel and for guiding the sheets in a common direction along the paths and into juxtaposition, heating means mounted adjacent the paths of travel for subjecting opposing inwardly facing localized surface portions of the sheets to dry heat and thereby heating the surfaces to an elevated, bonding temperature, press means mounted adjacent the paths of travel and at a location at which the sheets are juxtaposed and heated for pressing the sheets together and for bonding the sheets together in a longitudinally repetitive pattern which defines fluid flow passages therebetween, said press means comprising a pair of rolls mounted for rotation about respective axes transverse to the sheets and parallel one to the other and forming a nip, and endless apron means trained about one of said rolls for movement along a closed path of travel and through the nip formed by said pair of rolls and having a ribbed surface for engagement with a sheet passing through the nip and for defining a pattern of bonding for the sheets, and sealing means mounted adjacent the paths of travel and at a location at which the sheets are juxtaposed and heated for sealing the sheets along transverse lines spaced longitudinally of the sheets at predetermined distances and thereby for dividing the indeterminate length sheets into discrete length flexible wall containers.

2. Apparatus according to claim 1 wherein said seal means comprises roll means mounted for rotation adjacent the paths of travel of the sheets and for engagement with the advancing sheets, and further wherein said feed means comprises means for continually moving the sheets along the paths and adjacent said roll means.

3. Apparatus according to claim 2 wherein said roll means comprises a pair of rolls mounted for rotation about respective axes transverse to the sheets and parallel one to the other, said rolls together defining a nip through which the sheets pass and at which pressure is applied thereto.

4. Apparatus according to claim 3 further comprising endless apron means trained about one of said rolls for movement along a closed path of travel and through said nip formed by said pair of rolls and having a transverse rib on a surface thereof for engagement with a sheet passing through the nip and for defining a seal line for the sheets.

5. Apparatus according to claim 1 wherein said heating means comprises a biconvex heater interposed between the juxtaposed sheets immediately in advance of the engagement thereof with said press means for heating opposing inwardly facing surface portions of the sheets to an elevated, bonding temperature.

6. A method for manufacturing solar heating devices of a type having bonded together sheets of thermoplastic material forming a flexible wall container for fluid, the method comprising:

advancing first and second elongate indeterminate length sheets of thermoplastic material longitudinally along respective predetermined paths of travel while guiding the sheets in a common direction along the paths and into juxtaposition, subjecting opposing inwardly facing localized surface portions of the advancing sheets to dry heat as the sheets are guided along the paths and into juxtaposition and thereby heating the surface portions to an elevated, bonding temperature, p1 passing the advancing sheets through a nip formed between a pair of rolls mounted for rotation about respective axes transverse to the sheets and parallel one to the other and engaging the sheets with an endless, patterned surface apron trained about one of the rolls for movement along a closed path of travel and through the nip and pressing the juxtaposed, heated sheets together and bonding the sheets together in a longitudinally repetitive pattern defined by the apron and which defines fluid flow passages therebetween, and sealing the bonded together sheets along transverse lines spaced longitudinally of the sheets at predetermined distances and thereby dividing the indeterminate length sheets into discrete length flexible wall containers.

7. A method according to claim 6 wherein said step of sealing comprises engaging the advancing sheets with a roll mounted for rotation adjacent the paths of travel of the sheets, and further wherein said step of feeding comprises continually moving the sheets along the paths and adjacent the sealing roll.

8. A method according to claim 4 wherein said step of engaging the advancing sheets with a roll comprises passing the sheets through a nip formed between a pair of rolls mounted for rotation about respective axes transverse to the sheets and parallel one to the other at which pressure is applied thereto.

9. A method according to claim 6 wherein said step of sealing comprises engaging the sheets between a pair of sealing platens mounted for reciprocation adjacent the path of travel of the sheets, and further wherein said step of feeding comprises intermittently advancing the sheets.

10. A method according to claim 6 wherein said step of heating comprises passing the sheets adjacent a biconvex heater interposed between the juxtaposed sheets immediately in advance of the pressing thereof and thereby heating opposing inwardly facing surface portions of the sheets to an elevated, bonding temperature.

* * * * *